Jan. 13, 1953 L. J. WOLF 2,625,014
ROTARY HYDRAULIC COUPLING
Filed April 12, 1950 4 Sheets-Sheet 2

Inventor.
Lloyd J. Wolf.
By John M Darley
Attorney.

Jan. 13, 1953 L. J. WOLF 2,625,014
ROTARY HYDRAULIC COUPLING
Filed April 12, 1950 4 Sheets-Sheet 3

Inventor.
Lloyd J. Wolf.

By John M Darley
Attorney.

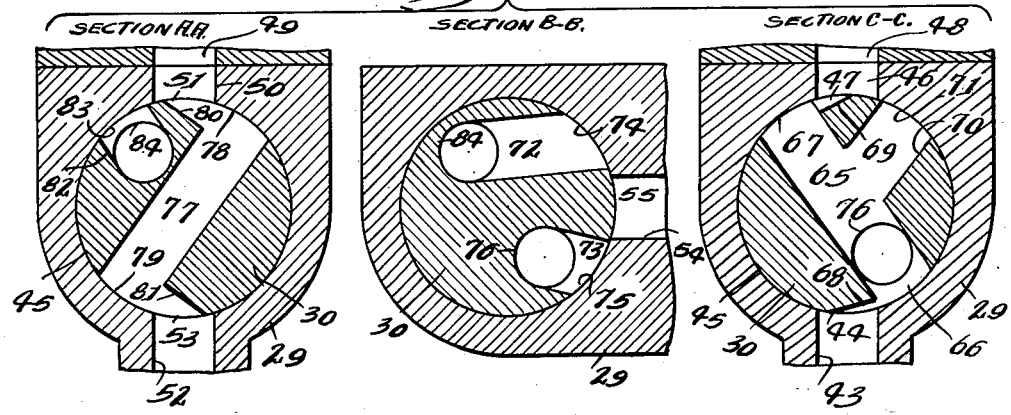
Fig. 5. NEUTRAL
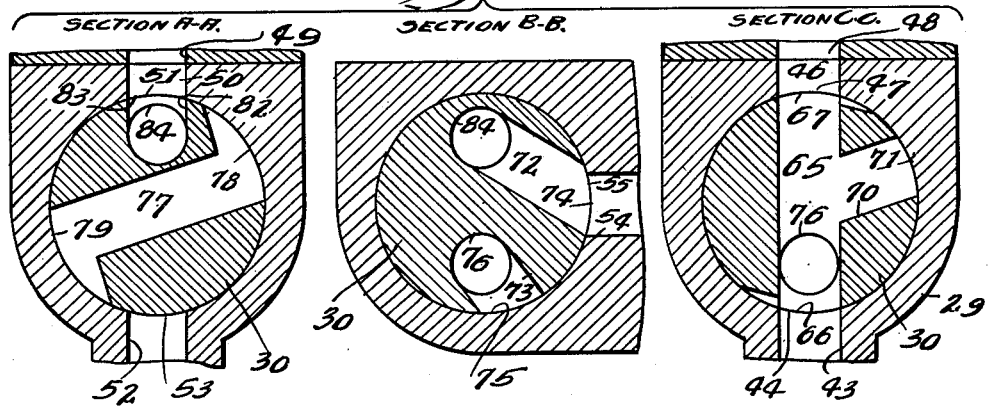
Fig. 6 FILL
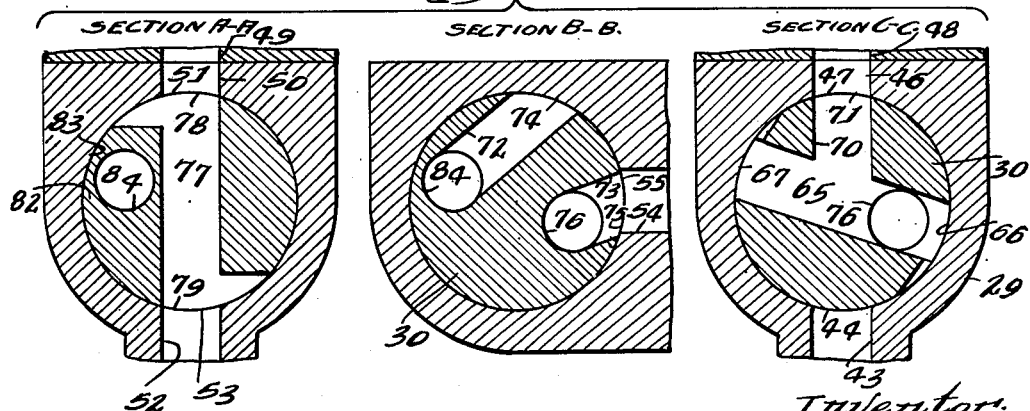
Fig. 7 DUMP
Inventor:
Lloyd J. Wolf.
By John M Darley
Attorney.

Patented Jan. 13, 1953

2,625,014

UNITED STATES PATENT OFFICE 2,625,014

ROTARY HYDRAULIC COUPLING

Lloyd J. Wolf, Racine, Wis., assignor to Twin Disc Clutch Company, Racine, Wis., a corporation of Wisconsin Application April 12, 1950, Serial No. 155,381

11 Claims. (Cl. 60—54)

My invention relates to hydraulic couplings and more particularly to a device of this type in which provision is made for varying the power transmitting relation of the impeller and runner members and hence their relative slip by regulating the quantity of working liquid.

Couplings of this general type are broadly old and they possess the advantage of enabling the driven machine to be stopped without disturbing the driving machine or source of power and of placing in operation a driven machine requiring a high starting torque. Such a unit therefore has clutching characteristics while exhibiting the usual advantages of a hydraulic coupling during periods of power transmission. Efficient operation of such devices under the above conditions requires a rapid filling and emptying of the coupling. The foregoing considerations represent limiting conditions, but it is also desirable to meet intermediate requirements which envisage varying degrees of slip through the coupling to produce varying output speeds by a relatively constant speed source of power.

It is therefore one object of my invention to devise a coupling of the character indicated in which the working liquid is supplied thereto during periods of power transmission by means operable to produce selected quantities of liquid in the coupling.

A further object is to provide a coupling whose filling or dumping is controlled by means which is additionally capable of interrupting the filling or dumping at any time while retaining in the coupling liquid present at the instant of interruption.

A further object is to provide a coupling as above in which filling and dumping is accomplished by the same pump whose suction capacity during dumping is boosted by the normal pressure differential between the coupling impeller and runner.

A further object is to provide a coupling of the empty-fill type having a vent which serves to clear air from the coupling during filling and provides a constant relief of the working liquid during periods of maximum fill.

These and further objects of the invention will be set forth in the following specification, reference being had to the accompanying drawings, and the novel means by which said objects are effectuated will be definitely pointed out in the claims.

In the drawings:

Figs. 5, 6 and 7 are group sections, the sections in each group being taken along the lines A—A, B—B and C—C, in Fig. 2 showing neutral, filling and dumping positions of the control valve, all respectively.

Figure 1:
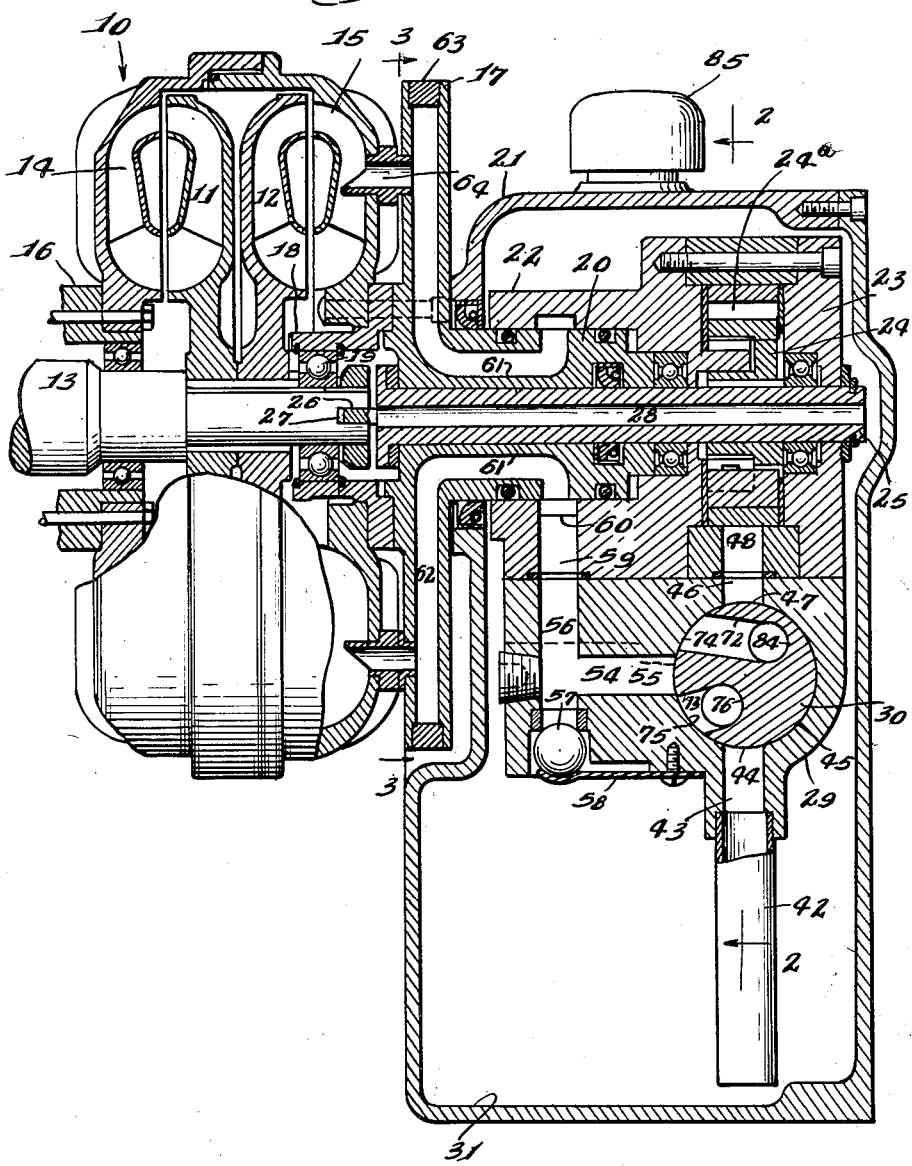
Fig. 1 is a sectional elevation of the coupling and the associated pump and valve control therefor, the valve being shown in neutral position and the section being taken along the line 1—1 in Fig. 2.

Referring to Fig. 1, the numeral 10 designates a twin circuit, hydraulic coupling comprising a pair of oppositely facing impellers 11 and 12 which are keyed to a driving shaft 13 connected to any source of power. A pair of connected, axially spaced and facing runners 14 and 15 are respectively located in working relation to the impellers 11 and 12, the runner 14 being bolted to a ring 16 which encircles the shaft 13 in coaxial and spaced relation and which may be connected to any suitable driven member, such as a sheave, gear or sprocket.

Figure 2:
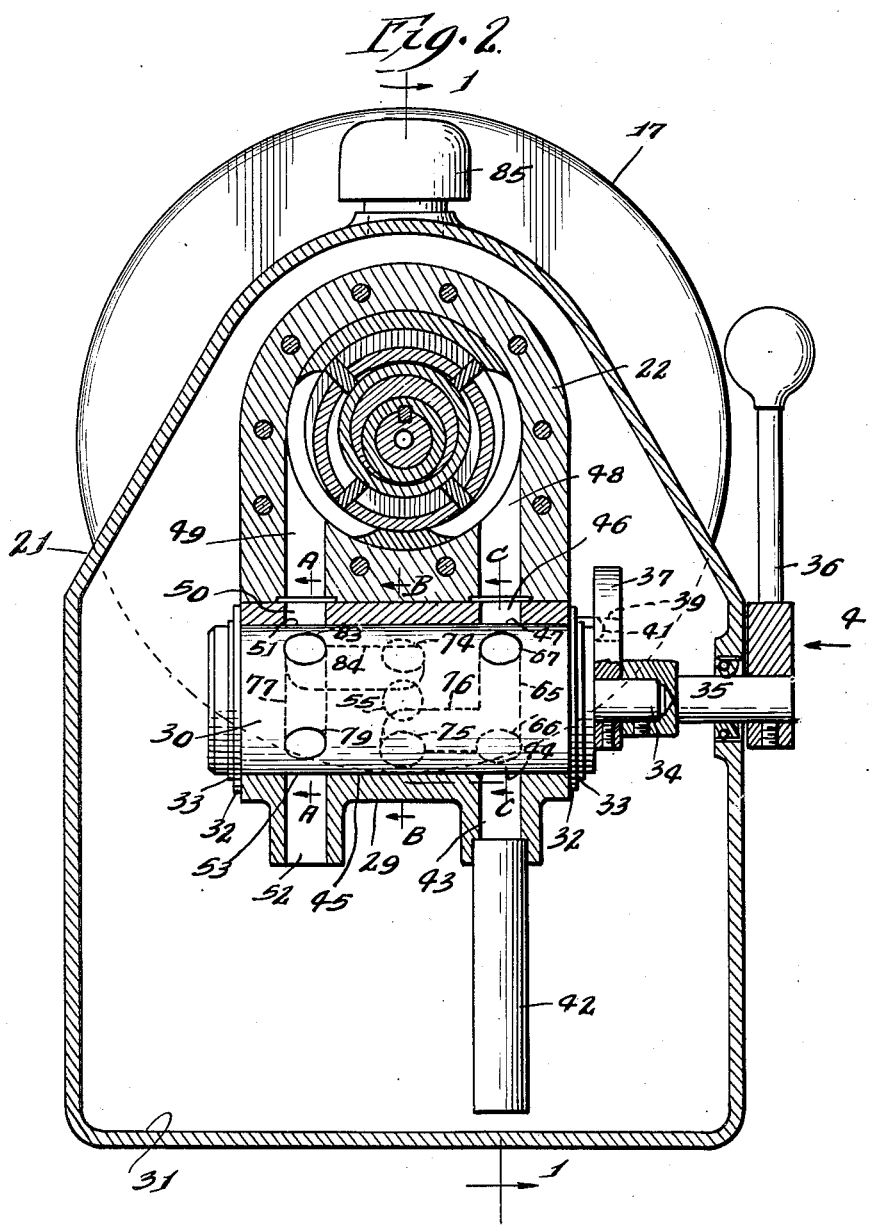
Fig. 2 is a section along the line 2—2 in Fig. 1.

The runner 15 is secured to a coaxial, disk manifold 17 and clamped therebetween is a ring 18 having mounted interiorly thereof a bearing 19 within which the extended end of the shaft 13 is piloted. The manifold 17 includes a hub 20 which projects through the adjacent wall of a housing 21 and is journaled in a recessed portion provided in one end of a pump casing 22 which is appropriately supported in the housing. A cover plate 23 is secured to the opposite end of the pump casing 22 and defines therewith a pump chamber 24a within which is operable a pump rotor of the guided vane type (see Fig. 2), the rotor being keyed to one end of a shaft 25 that is journaled in the casing 22 and cap 23 and is axially aligned with the shaft 13. The opposite end of the shaft 25 includes a fin 26 which fits within a slot provided in the adjacent end of the shaft 13 to thereby provide a driving connection for the shaft 25. An axial passage 28 extends through the shaft 25 and provides a means of communication between the interiors of the coupling 10 and housing 21 for a purpose presently explained.

Figure 4:
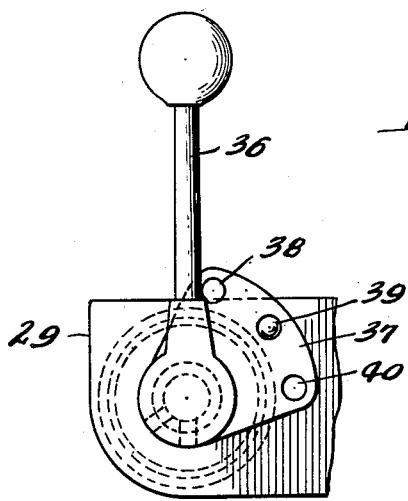
Fig. 4 is an elevation, looking in the direction of the arrow 4 in Fig. 2, showing the handle for controlling the oil flow.

A valve casing 29 depends from the pump casing 22 and rockable within the casing 29 is a cylindrical valve 30 whose position determines the filling or dumping of the coupling in any desired amount and inclusive of a neutral position in which the working liquid in the coupling, if any, is retained therein and the remaining liquid is bypassed by the pump from and to the sump 31 provded in the lower part of the housing 21. The valve 30 extends beyond the opposite ends of the casing 29 and is restrained against endwise movement by washers 32—32 which abut opposite ends of the casing 29 and are held by spring rings 33—33 which seat within annular grooves (not shown) in the valve (see Fig. 2). One end of the valve 30 is reduced in diameter at 34 and secured to the inner end of a rock shaft 35 which projects through the adjacent wall of the housing 21 and has affixed thereto a control handle 36. The reduced valve portion 34 carries a sector plate 37 (see Figs. 2 and 4) having apertures 38, 39 and 40 which are selectively registrable with the end of a yieldable detent 41 mounted in the casing 29 to respectively determine filling, neutral and dumping positions of the handle 36. In the drawings, the detent 41 seats in the neutral aperture 39.

The transfer of the working liquid, usually an oil, from the sump 31 to the coupling 10 during filling and the return to the sump during dumping, and the handling of the oil when the valve 30 is in a neutral position, is effected through a plurality of ports and passages which will now be described.

The lower end of a suction pipe 42 dips into the sump 31 and its upper end is carried by the lower side of the valve casing 29 which includes a passage 43 that constitutes a continuation of the pipe 42 and terminates in a port 44 at the face of the bore 45 in which the valve 30 fits. A passage 46 extends through the wall of the valve casing 29 on the opposite side of the bore 45 in alignment with the passage 43, the inner end of the passage 46 terminating in a port 47 at the face of the bore 45 and its outer end communicating with a passage 48 in the pump casing 22 which constitutes the suction inlet for the pump rotor 24. The rotor 24 discharges into a passage 49 (see Fig. 2) in the pump casing 22 which communicates with a passage 50 whose inner end with respect to the valve 30 terminates in a port 51 at the face of the valve bore 45 above the valve 30. Also provided in the valve casing 29 in alignment with the passage 50, but on the opposite and lower side of the bore 45 and in depending relation to the casing is a discharge passage 52 which communicates with the sump 31 and whose inward end terminates in a port 53 at the face of the bore 45.

The valve casing 29 also includes a horizontal passage 54 (see Fig. 1) positioned generally between and above the passage 43 and 52, one end of the passage 54 terminating in a port 55 at the face of the bore 45 and whose opposite end connects with a vertical passage 56, also in the casing 29. The lower end of the passage 56 is normally closed by a ball check valve 57 through the medium of the free end of a cantilever, leaf spring 58 whose fast end is secured to the under side of the valve casing 29. The valve 57 serves to relieve pressures in the coupling above those which can be vented through the passage 28.

Figure 3:
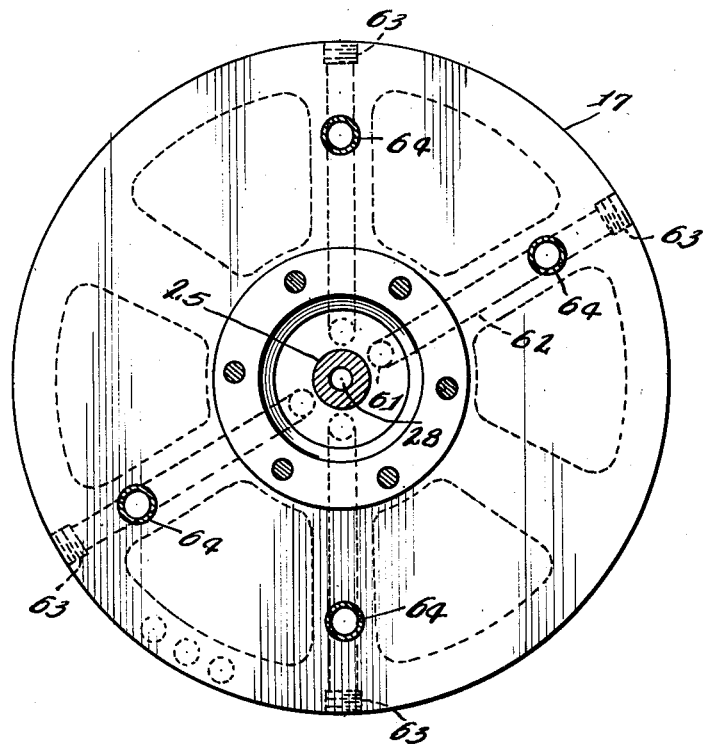
Fig. 3 is a section along the line 3—3 in Fig. 1 showing the disk manifold through which the oil is pumped into and out of the coupling.

The opposite end of the passage 56 constantly communicates with one end of a passage 59 in the pump casing 22 whose opposite end connects with an annular channel 60 which faces the bore in which the hub 20 of the disk manifold 17 is journaled. Longitudinal passages 61 are provided in and spaced around the hub 20 (see Figs. 1 and 3), one end of each passage 61 constantly communicating with the channel 60 and the opposite end with a radial passage 62 in the disk part of the manifold 17. The outer end of each pasage 62 is closed by a plug 63 and, inward of each plug, a hollow scoop 64 is bridged between the manifold 17 and the runner 15 and through which the oil is pumped into and out of the coupling 10. The coupling end of each scoop 64 extends within the associated working passage of the runner 15.

The valve 30 provides a means of connecting selected relations of the above ports and passages under controlled circumstances and also includes ports and passages for accomplishing these results as will now be described. Generally speaking, and with the exception of certain longitudinal passages, the valve ports and passages are arranged along the section lines A—A, B—B and C—C in Fig. 2 and which, respectively, are shown in neutral, filling and dumping positions in Figs. 5, 6 and 7.

Considering section C—C with the valve in the neutral position shown in Fig. 5, the valve 30 includes a diametral passage 65 whose lower and upper ends terminate at the face of the valve in ports 66 and 67, respectively. The surface of the valve 30 is flattened at 68 and 69 to slightly enlarge the ports 66 and 67, respectively, for a purpose presently explained. In the same plane of the valve is included a radial passage 70 angularly related to the passage 65 and whose inner end connects with the passage 65 and whose outer end terminates in a port 71 at the face of the valve. From the foregoing, it will be understood that the passages 65 and 70 are generally Y-related.

At section B—B, the valve 30 is provided with chordal passages 72 and 73 which are disposed, respectively, above and below the horizontal diameter of the valve in the position shown and are angularly related, i. e., they diverge towards the right, as viewed in Fig. 5, and terminate at the valve face in ports 74 and 75, respectively. The opposite end of the passage 73 connects with one end of a longitudinal passage 76, wholly included within the body of the valve 30, and the opposite end of the passage 76 connects with the lower end of the passage 65 in section C—C.

At section A—A, the valve 30 includes a diametral passage 77 whose upper and lower ends terminate at the face of the valve in ports 78 and 79, respectively. The surface of the valve 30 is flattened at 80 and 81 to slightly enlarge the ports 78 and 79, respectively, for a purpose presently explained. In the same plane of the valve is included a radial passage 82 which is angularly related to the passage 77 and whose length is less than the radius of the valve. The outer end of the passage 82 terminates at the face of the valve in a port 83 and its inner end connects with one end of a longitudinal passage 84, wholly included in the body of the valve 30 and which, in the position of parts shown, lies above the passage 77 and above the horizontal diameter of the valve. The opposite end of the passage 84 connects with the passage 72.

In describing the operation of the coupling and its control, it will be assumed that the shaft 13 is connected to a power source and rotating, that the coupling is empty, and that the control handle 36 is in the neutral position. The valve 30 then occupies the position shown in Figs. 1 and 2 and the ports and passages thereof are related as indicated in Fig. 5. Further, the pump rotor 24 is operating.

Under these conditions, the ports 71, 74, 75 and 83 are masked by the valve bore 45. Despite the fact that the passage 65 is not aligned with the passages 43 and 46 and that the passage 77 is not aligned with the passages 49 and 52, the enlargement of the ports 66 and 67 and the similar conditioning of the ports 78 and 79 insures that the pump rotor 24 will draw oil from the sump 31 upwardly through the pipe 42 and passages 43, 65, 46 and 48 and will discharge to the sump through passages 49, 50, 77 and 52. No oil will flow to the coupling in the neutral position of the valve 30, since the valve port 74 is out of registration with the port 55 leading to the passage 54 which is the only route by which oil can be pumped into the coupling. Hence, under the conditions stated, the pump merely bypasses the oil from and to the sump.

To fill the coupling, the valve 30 is rocked clockwise from the position shown in Fig. 5, or counterclockwise as viewed in Fig. 1, to the position shown in Fig. 6 in which the passage 65 is aligned with the passages 43 and 46, the port 74 registers with the port 55, the port 83 registers with the port 51, and the ports 71, 75, 78 and 79 are masked. The oil is then lifted by the pump rotor 24 from the sump 31 upwardly through the pipe 42, passages 43, 65, 46 and 48, and discharged through the passages 49 and 50 to the longitudinal passage 84 from which it flows through the passages 72, 54, 56, 61 and 62 to the scoops 64 and thence into the coupling 10. During this filling operation, air is vented from the coupling through the passage 23 in the pump shaft 25 to the interior of the housing 21. A breather tube 85 carried by this housing provides means through which oil may be supplied thereto as well as insuring free communication between the interior of the housing and the outside air.

If the output speed requires that the coupling be filled to its maximum capacity, the valve 30 is held in the position shown in Fig. 6 and the passage 28 then provides a constant relief through which oil returns to the sump 31. If a pressure condition in the coupling is created which cannot be adequately handled by the passage 28, the check valve 57 opens to relieve the excess pressure. Therefore, under a condition of maximum fill, the oil is constantly circulated between the sump and the coupling. Depending upon the speed requirements, the filling of the coupling may be stopped at any point short of maximum fill by moving the valve 30 to the neutral position shown in Fig. 5. The pumped oil is then recirculated between the pump and sump as described above and the oil then in the coupling cannot escape through the scoops 64 since the port 55 which communicates through the associated passages with the scoops is then masked by the valve 30. Further, the oil cannot escape through the passage 28 since centrifugal force holds it radially outward in the working passages of the coupling. Moreover, under a condition of partial fill, there is sufficient air in the central part of the coupling to cushion excessive pressures, if any, and which can be relieved through the passage 28. Hence, the valve 57 will remain closed.

If it is desired to dump the coupling while wholly or partly filled, the valve 30 is rocked counterclockwise from the position shown in Figs. 5 or 6 as the case may be, or clockwise as viewed in Fig. 1, to the position shown in Fig. 7. The ports 66 and 67 are then masked, thus interrupting communication between the suction side of the pump and the sump through the passage 43. At the same time, the port 74 is masked and the ports 75 and 55 are placed in registration, thus connecting the interior of the coupling with the suction side of the pump through the scoops 64 and successively through the passages 62, 61, 59, 56, 54, 73, 76, 65, 71, 46 and 48. At section A—A, the ports 78 and 51 and the ports 79 and 53 register, respectively, so that the pump discharges to the sump 31 successively through passages 49, 50, 77 and 52. This discharge may continue until the coupling is fully dumped.

At any time during the dumping operation and whether the coupling was originally filled or partly filled, the dumping may be interrupted by returning the valve 30 to the neutral position shown in Fig. 5 and such liquid as may then be in the coupling will be retained therein for reasons noted above, or if during dumping, the output speed requirements necessitate additional liquid in the coupling, the valve 30 may be positioned to effect this result.

From the foregoing, it will be understood that the coupling, due to the manner of controlling the extent of its fill, is highly flexible in operation and is capable of almost instantaneously adjusting to any output speed within a range that may be handled by any particular size of coupling. The coupling provides a constant torque from full to zero R. P. M. and constant horsepower under varying conditions of fill. With the exception of the relief at maximum fill provided by the passage 28, the coupling is forcibly filled and dumped through the same passages, exclusive of those in the valve 30. An important feature of the invention that facilitates rapid dumping is the booster action on the pump suction provided by the normal pressure differential within the coupling between the impellers and runners. Further, pressure filling of the coupling eliminates any tendency towards cavitation in the working passages so that the expected efficiency of the coupling is attained.

I claim:

1. The combination of a hydraulic coupling having an impeller and a runner, a liquid source, a pump casing having an inlet and an outlet, a shaft journaled in the casing in coaxial relation with and connected to the impeller and including an axial passage communicating at its ends, respectively, with the interior of the coupling and the source, a manifold secured to the runner concentric with the shaft and having a hub journaled in the casing, the manifold and hub including a plurality of passages, hollow scoops bridged between those parts of the passages which lie in the outer part of the manifold and the adjacent working passages of the runner, a pump rotor secured to the shaft and positioned within the casing, and means of communication between the source and coupling including the pump, manifold passages and valve means shiftable between positions connecting the pump inlet to the source and the pump outlet to the manifold passages to supply liquid to the coupling and the pump inlet to the manifold passages and the pump outlet to the source to dump the coupling, respectively, the axial passage venting air from the coupling during filling and providing constant relief during maximum fill.

2. The combination of a hydraulic coupling having an impeller and a runner, a liquid source, a pump casing having an inlet and an outlet, a shaft journaled in the casing in coaxial relation with and connected to the impeller and including an axial passage communicating at its ends, respectively, with the interior of the coupling and the source, a manifold secured to the runner concentric with the shaft and having a hub journaled in the casing, the manifold and hub including a plurality of passages, hollow scoops bridged between those parts of the passages which lie in the outer part of the manifold and the adjacent working passages of the runner, a pump rotor secured to the shaft and positioned within the casing, and means of communication between the source and coupling including the pump, manifold passages and valve means operable to selectively connect the source to the pump inlet and the pump outlet to the coupling to supply liquid thereto, to connect the coupling to the pump inlet and the pump outlet to the source to dump the coupling, and to provide a bypass connection between the source and pump constituting a neutral position of the valve means, the axial passage venting air from the coupling during filling and providing constant relief during maximum fill.

3. The combination of a hydraulic coupling having an impeller and a runner, a liquid source, a pump casing having an inlet and an outlet, a pump rotor operable in the casing and connected to the impeller, a manifold rotatable with the runner and having outwardly extending passages, hollow scoops connecting the outer portions of the manifold passages and the adjacent working passages of the runner, means of communication between the source and coupling including the pump, manifold passages and valve means shiftable between positions connecting the pump inlet to the source and the pump outlet to the manifold passages to supply liquid to the coupling and the pump inlet to the manifold passages and the pump outlet to the source to remove liquid from the coupling, respectively, and means for venting air from the coupling during filling and providing constant relief during maximum fill.

4. The combination of a hydraulic coupling having an impeller and a runner, a liquid source, a pump casing having an inlet and an outlet, a pump rotor operable in the casing and connected to the impeller, a manifold rotatable with the runner and having outwardly extending passages, hollow scoops connecting the outer portions of the manifold passages and the adjacent working passages of the runner, means of communication between the source and coupling including the pump, manifold passages and valve means operable to selectively connect the source to the pump inlet and the pump outlet to the manifold passages to supply liquid to the coupling, to connect the pump inlet to the manifold passages and the pump outlet to the source to remove liquid from the coupling, and to provide a bypass connection between the source and pump constituting a neutral position of the valve means, and means for venting air from the coupling during filling and providing constant relief during maximum fill.

5. The combination of a hydraulic coupling having an impeller and a runner, a liquid source, casing means including a pump chamber and a valve bore, the pump chamber having an inlet and an outlet communicating with the valve bore, a pump rotor operable in the pump chamber and connected to the impeller, suction and discharge passages in the casing means communicating with the liquid source and terminating at the valve bore, a manifold rotatable with the runner and having outwardly extending passages, hollow scoops connecting the outer portions of the manifold passages and the adjacent working passages of the runner, an intermediate passage in the casing means connecting the valve bore with the inner portions of the manifold passages, a multi-passaged valve rotatable in the valve bore between positions connecting the suction passage to the pump chamber inlet and the pump chamber outlet to the intermediate passage to supply liquid to the coupling and the pump chamber inlet to the intermediate passage and the pump chamber outlet to the discharge passage to remove liquid from the coupling, respectively, and means for venting air from the coupling during filling and providing constant relief during maximum fill.

6. The combination of a hydraulic coupling having an impeller and a runner, a liquid source, casing means including a pump chamber and a valve bore, the pump chamber having an inlet and an outlet communicating with the valve bore, a pump rotor operable in the pump chamber and connected to the impeller, suction and discharge passages in the casing means communicating with the liquid source and terminating at the valve bore, a manifold rotatable with the runner and having outwardly extending passages, hollow scoops connecting the outer portions of the manifold passages and the adjacent working passages of the runner, an intermediate passage in the casing means connecting the valve bore with the inner portions of the manifold passages, a multi-passaged valve rotatable in the valve bore to selectively connect the suction passage to the pump chamber inlet and the pump chamber outlet to the intermediate passage to supply liquid to the coupling, to connect the pump chamber inlet to the intermediate passage and the pump chamber outlet to the discharge passage to remove liquid from the coupling, and to connect the pump chamber inlet to the suction passage and the pump chamber outlet to the discharge passage to provide a bypass connection between the source and pump chamber constituting a neutral position of the valve, and means for venting air from the coupling during filling and providing constant relief during maximum fill.

7. The combination of a hydraulic coupling having driving and driven bladed members cooperably related to provide a hydraulic working circuit, a liquid source, casing means including a pump chamber and a valve bore, the pump chamber having an inlet and an outlet each communicating with the valve bore, a pump rotor operable in the pump chamber and connected to the driving bladed member, suction and discharge passages in the casing means communicating with the liquid source and terminating at the valve bore, passage means connecting the working passages of one of the bladed members with the valve bore, and a valve operable in the valve bore between positions connecting the suction passage to the pump chamber inlet and the pump chamber outlet to the passage means to supply liquid to the coupling and the pump chamber inlet to the passage means and the pump chamber outlet to the discharge passage to remove liquid from the coupling, respectively.

8. The combination of a hydraulic coupling having driving and driven bladed members cooperably related to provide a hydraulic working circuit, a liquid source, casing means including a pump chamber and a valve bore, the pump chamber having an inlet and an outlet each communicating with the valve bore, a pump rotor operable in the pump chamber and connected to the driving bladed member, suction and discharge passages in the casing means communicating with the liquid source and terminating at the valve bore, passage means connecting the working passages of one of the bladed members with the valve bore, and a valve operable in the valve bore to selectively connect the suction passage to the pump chamber inlet and the pump chamber outlet to the passage means to supply liquid to the coupling, to connect the pump chamber inlet to the passage means and the pump chamber outlet to the discharge passage to remove liquid from the coupling, and to connect the pump chamber inlet to the suction passage and the pump chamber outlet to the discharge passage to provide a bypass connection between the source and pump chamber constituting a neutral position of the valve.

9. The combination of a hydraulic coupling having driving and driven bladed members cooperably related to provide a hydraulic working circuit, a liquid source, casing means including a pump chamber and a valve bore, the pump chamber having an inlet and an outlet each communicating with the valve bore, a pump rotor operable in the pump chamber and connected to the driving bladed member, suction and discharge passages in the casing means communicating with the liquid source and terminating at the valve bore, passage means connecting the working passages of one of the bladed members with the valve bore, a valve operable in the valve bore between positions connecting the suction passage to the pump chamber inlet and the pump chamber outlet to the passage means to supply liquid to the coupling and the pump chamber inlet to the passage means and the pump chamber outlet to the discharge passage to remove liquid from the coupling, respectively, and means for venting air from the coupling during filling and providing constant relief during maximum fill.

10. The combination of a hydraulic coupling having driving and driven bladed members cooperably related to provide a hydraulic working circuit, a liquid source, casing means including a pump chamber and a valve bore, the pump chamber having an inlet and an outlet each communicating with the valve bore, a pump rotor operable in the pump chamber and connected to the driving bladed member, suction and discharge passages in the casing means communicating with the liquid source and terminating at the valve bore, passage means connecting the working passages of one of the bladed members with the valve bore, a valve operable in the valve bore to selectively connect the suction passage to the pump chamber inlet and the pump chamber outlet to the passage means to supply liquid to the coupling, to connect the pump chamber inlet to the passage means and the pump chamber outlet to the discharge passage to remove liquid from the coupling, and to connect the pump chamber inlet to the suction passage and the pump chamber outlet to the discharge passage to provide a bypass connection between the source and pump chamber constituting a neutral position of the valve, and means for venting air from the coupling during filling and providing constant relief during maximum fill.

11. The combination of a hydraulic coupling having driving and driven bladed members cooperably related to provide a hydraulic working circuit, a liquid source, casing means including a pump chamber and a valve bore, the pump chamber having an inlet and an outlet each communicating with the valve bore, a shaft journaled in the casing means in coaxial relation with and connected to the driving bladed member and including an axial passage communicating at its ends, respectively, with the interior of the coupling and the source, a pump rotor secured to the shaft and positioned within the pump chamber, suction and discharge passages in the casing means communicating with the liquid source and terminating at the valve bore, passage means connecting the working passages of one of the bladed members with the valve bore, and a valve operable in the valve bore between positions connecting the suction passage to the pump chamber inlet and the pump chamber outlet to the passage means to supply liquid to the coupling and the pump chamber inlet to the passage means and the pump chamber outlet to the discharge passage to remove liquid from the coupling, respectively, the axial passage venting air from the coupling during filling and providing constant relief during maximum fill.

LLOYD J. WOLF.

REFERENCES CITED

The following references are of record in the file of this patent:

UNITED STATES PATENTS

| Number | Name | Date |
| --- | --- | --- |
| 2,062,281 | Alison | Dec. 1, 1936 |
| 2,299,049 | Ziebolz | Oct. 13, 1942 |
| 2,343,786 | Martin | Mar. 7, 1944 |